(12) United States Patent
Sayag

(10) Patent No.: US 6,172,667 B1
(45) Date of Patent: Jan. 9, 2001

(54) OPTICALLY-BASED TOUCH SCREEN INPUT DEVICE

(75) Inventor: Michel Sayag, 1820 Hackett Ave., Mountain View, CA (US) 94043

(73) Assignee: Michel Sayag, Mountain View, CA (US)

(*) Notice: Under 35 U.S.C. 154(b), the term of this patent shall be extended for 0 days.

(21) Appl. No.: 09/045,059

(22) Filed: Mar. 19, 1998

(51) Int. Cl.$^7$ .................................................. G09G 5/00
(52) U.S. Cl. ..................... 345/175; 345/173; 345/174; 345/176
(58) Field of Search ..................... 345/175, 173, 345/174, 176; 380/25; 385/18.04; 178/18.04; 341/13; 313/478

(56) References Cited

U.S. PATENT DOCUMENTS

| | | | |
|---|---|---|---|
| 3,579,225 | 5/1971 | Clark | 340/324 A |
| 3,613,066 | 10/1971 | Cooreman | 340/347 |
| 3,621,268 | 11/1971 | Friedrich et al. | 250/221 |
| 3,659,281 | 4/1972 | Mori | 340/324 A |
| 3,673,327 * | 6/1972 | Johnson et al. | 178/18.04 |
| 3,777,153 | 12/1973 | Anderson et al. | 250/227 |
| 3,891,890 | 6/1975 | Yasuda et al. | 315/365 |
| 4,190,831 | 2/1980 | Stahle et al. | 340/707 |
| 4,305,071 | 12/1981 | Bell et al. | 340/712 |
| 4,346,376 | 8/1982 | Mallos | 340/712 |
| 4,367,465 | 1/1983 | Mati et al. | 340/707 |
| 4,484,179 | 11/1984 | Kasday | 340/365 |
| 4,542,375 | 9/1985 | Alles et al. | 340/712 |
| 4,673,918 * | 6/1987 | Adler et al. | 341/13 |
| 4,686,332 * | 8/1987 | Greanias | 345/173 |
| 4,707,689 | 11/1987 | DiPiazza et al. | 340/706 |
| 4,733,022 | 3/1988 | Wales et al. | 178/18 |
| 4,766,424 | 8/1988 | Adler et al. | 340/712 |
| 4,779,025 * | 10/1988 | Paynton | 313/478 |
| 4,816,811 * | 3/1989 | Bogatin et al. | 345/173 |
| 4,851,616 | 7/1989 | Wales et al. | 178/18 |
| 4,868,551 * | 9/1989 | Arditty et al. | 345/176 |
| 4,963,859 * | 10/1990 | Parks | 345/176 |
| 5,196,836 * | 3/1993 | Williams | 345/175 |
| 5,376,946 | 12/1994 | Mikan | 345/157 |
| 5,428,367 | 6/1995 | Mikan | 345/157 |
| 5,515,083 | 5/1996 | Casebolt et al. | 345/175 |
| 5,568,579 * | 10/1996 | Okaniwa | 385/18.04 |
| 5,736,686 * | 4/1998 | Perret, Jr. et al. | 178/18.11 |

OTHER PUBLICATIONS

R.H. Harris, "Optical Overlay Input Device for a Cathode Ray Tube," Nov. 1981,*IBM Corp.*
P. Callens, "Optical Keyboard Device and Technique," Nov. 1983, *IBM Corp.*
N.S. Kapany, "Fiber Optics Principles and Applications," 1967, Palo Alto, California,*Academic Press*.

* cited by examiner

*Primary Examiner*—Steven J. Saras
*Assistant Examiner*—Fritz Alphonse
(74) *Attorney, Agent, or Firm*—Beyer Weaver & Thomas, LLP

(57) ABSTRACT

An input device comprising an overlay for a display screen comprising an optically conductive material is described. The overlay has a central region for transmitting first electromagnetic radiation corresponding to an object in contact with the overlay at a first location, and a light conduit along the edge of the central region for receiving and transmitting the first electromagnetic radiation. The light conduit is configured to inhibit transmission of the first electromagnetic radiation back into the central region of the overlay. At least one detector is coupled to the light conduit for receiving the first electromagnetic radiation and generating a signal indicative thereof. Location circuitry receives the signal and generates location data indicative of the first location.

23 Claims, 8 Drawing Sheets

OPTICALLY-BASED TOUCH SCREEN INPUT DEVICE

BACKGROUND OF THE INVENTION

The present invention relates to an input device for systems employing display screens. More specifically, the present invention provides an inexpensive, optically-based overlay for a display screen which, with support electronics, functions as a touch screen input device.

There are currently four different types of commercially available touch screen technologies: infrared, resistive membrane, capacitive, and surface acoustic wave. All of these are active technologies in that they rely on generating an active signal and observing the effect on the active signal of an object against the screen, i.e., a touch event.

Infrared technology was the first type of commercially available touch screen technology. According to infrared technology, infrared beams are transmitted across the screen in a grid pattern. Upon the occurrence of a touch event, specific beams are interrupted and the location of the touch event is determined from the known intersection of the interrupted beams.

Resistive touch screen technology employs a glass or acrylic panel coated with thin, transparent, electrically conductive and resistive layers through which electrical current flows. The layers are separated by transparent separator dots. When pressure is applied to the screen, the layers are pressed together thereby affecting the resistivity of the layers at the location of the touch event. This change in resistivity is registered as a change in current from which the location of the event is determined.

Capacitive touch screen technology employs a plurality of electrodes which generate a substantially uniform electric field across the screen. In response to a touch event, the capacitance across the electrodes at the location of the event is altered thereby altering the electric field at that location. Monitoring circuitry detects the disturbance of the field and reports a touch event at the location of the disturbance.

Surface acoustic wave technology, as the name suggests, transmits acoustic waves across the surface of the display screen. As with infrared technology, the location of a touch event is determined from the interruption of the waves by the event.

All of these technologies are mature and are used to produce a wide variety of products, some of which are manufactured in reasonably high volume. However, as will be understood, each technology has its own calibration and mechanical registration issues which tend to keep the cost and complexity of touch screens high and their reliability low.

Another type of input device technology which involves the display screen and which addresses some of the issues discussed above is the light pen. In the conventional cathode ray tube (CRT) display screen, an electron gun scans a raster beam across a phosphor screen one raster line at a time starting at the upper left corner of the screen. When a raster line is complete, i.e., the raster beam reaches the edge of the screen, the electron gun turns off, moves down one line, turns on again, and scans the next line. This is repeated until the entire screen is scanned at which point the gun moves to the upper left corner of the screen to repeat the process. As the raster beam hits the phosphor on the screen, the phosphor glows brightly and then slowly dims until the beam hits it again. In the typical computer system, a display or graphics card generates the video signal which controls the raster beam according to precise timing information.

The typical light pen includes a pinpoint lens and small photodetector at the tip of the pen connected to a Schmitt trigger flip-flop. The tip of the light pen is held in contact with the display screen in response to which the light pen generates an output pulse representative of the phosphor glow and decay at the location of the contact. Based on the time at which the output pulse of the light pen is received and the raster timing information from the graphics card, circuitry to which the light pen is connected correlates the occurrence of the pulse with the known position of the raster beam at that time thereby determining the exact location of the tip of the light pen.

However, while the light pen addresses several of the issues presented by commercial touch screen technologies it is more complex from a user's perspective, adding yet another peripheral device to be connected and configured. The light pen also represents another level of complexity from a reliability perspective which is generally undesirable.

Another type of optically-based touch screen technology has been described in the literature but has not been implemented in any known commercially available products. The technology is a passive technology which, if viable, would also require no calibration or mechanical registration with respect to the display screen. As described in U.S. Pat. Nos. 4,346,376 and 4,484,179, the entire specifications of which are incorporated herein by reference for all purposes, and as shown in FIGS. 1*a* and 1*b* of the present application, a transparent glass or plastic plate 102 is placed in front of the CRT 104. At the edge of the plate, one or more detectors 106 are mounted to receive light 108 from CRT 104 which is diffused by an object (e.g., a fingertip 110) in contact with plate 102 and trapped within plate 102 by total internal reflection, i.e., diffused by the object beyond the critical angle of the plate material.

As with the light pen technology discussed above, the reception of the light corresponding to the touch event is intended to be correlated with the raster timing information to determine the location of the event. However, unlike the detector in the light pen which receives a significant portion of the light emitted by the CRT at the touch location, the detectors in this optically-based technology receive a very small fraction of the light diffused by the fingertip and are simultaneously exposed to significant and undesirable light energy from other sources. For example, parasitic reflections of light from the display screen which are within the critical angle reach the detectors resulting in a very poor signal-to-noise ratio. This presents extremely challenging requirements for the touch event detection circuitry as described in U.S. Pat. Nos. 4,305,071 and 4,707,689, the entire specifications of which are incorporated herein by reference for all purposes. Thus, while the previously described optically-based touch screens have some desirable characteristics, there continue to be significant challenges to the commercial viability of the technology.

Another optically-based touch screen is described in U.S. Pat. No. 4,868,551, the entire specification of which is incorporated herein by reference for all purposes. The principle on which this input device is based is the same as that relied on in the '376 and '179 patents and discussed above with reference to FIGS. 1*a* and 1*b*. The devices described in the '551 patent attempt to solve the signal-to-noise problem by increasing the efficiency with which its photodetectors collect light. This is done through the use of concentrating or focusing systems in conjunction with reflective coatings at some edges of the touch plate. Some of these focusing systems comprise extensions of the plate material having geometries which, with the use of reflective coatings, tend to concentrate the light energy trapped within the plate toward a photodetector disposed at a narrow end of the extension.

Unfortunately, even if the focusing extensions and reflective coatings work as described, the problem of parasitic reflections and their effect on the signal-to-noise ratio is not addressed. That is, the photodetectors of the '551 patent would still not be able to distinguish between light energy corresponding to a touch event and undesirable parasitic reflections.

It is therefore desirable to develop improvements to previously described optically-based touch screen technologies which increase the collection of light corresponding to a touch event and simultaneously reduce the amount of parasitic noise received, thereby improving the signal-to-noise ratio.

SUMMARY OF THE INVENTION

According to the present invention, an optically-based input device is provided for use with any of a wide variety of systems which employ raster scan display screens which is simple, inexpensive, and addresses the signal-to-noise problem of previously described optically-based systems. The input device of the present invention employs an overlay sheet or plate of an optically conductive material such as plastic or glass in close proximity to a display screen. A light conduit, also referred to herein as a "light gutter", runs along the edge of the overlay. According to a specific embodiment, the light gutter is cylindrical and is made of the same optically conductive material as the central portion of the overlay which is adjacent the display screen. According to various embodiments, there may be individual light gutters along one or more of the edges of the overlay which are not connected to each other. According to other embodiments, there may be a single light gutter which runs along two or more edges via rounded portions of the gutter at the corners of the overlay.

The diameter of the light gutter is controlled to be significantly larger than the thickness of the central portion of the overlay to which it is adjacent. Because of this geometry, the likelihood that light propagating into the conduit from the central region of the overlay will re-enter the central region is small. That is, most of the light diffused by an object in contact with the overlay beyond the critical angle is trapped in the light gutter once it propagates to the perimeter of the overlay.

Because of the geometry of the light gutter, the trapped light energy propagates in both directions along its longitudinal axis like an optical fiber. Light transmitted in this manner is easily received by appropriately positioned detectors. According to various embodiments, light collection at the gutter extremities is achieved by directly coupling photodetectors or, alternatively, by using relay lenses to condense light coming out of the gutters onto the photodetectors. Thus, unlike other optically based touch screens, the present invention ensures that a much greater portion of the light trapped in the optical medium due to the touch of an object is collected.

Depending upon the particular configuration of light gutters, and as mentioned above, detectors are appropriately positioned and coupled to the gutters to receive the light energy propagating along their longitudinal axes. The time at which the light energy corresponding to a particular touch event is received is then correlated with timing information from the display's raster scan circuitry to determine the location of the event. That is, because the position of the raster beam at any given point in time may be determined from the raster timing information, it follows that the position of a touch event may be determined by noting the time at which the diffused light from the touch event is received and correlating that with the position of the raster beam at that time.

According to a specific embodiment of the invention, further improvements in performance are achieved by controlling the thickness of the central region near the perimeter to inhibit light energy not due to a touch event from entering the light gutter(s). Such light energy may be the result of multiple reflections below the critical angle of light entering the overlay material from, for example, the display screen. Without some means of preventing these parasitic reflections from entering the light gutter(s), they are received at the detector(s) as noise which makes detection of a touch event more difficult. Such parasitic noise may be particularly intense and troublesome for very bright spots on the display screen.

In a specific embodiment, the edge of the central region of the overlay is beveled to create a tapered region immediately adjacent the light gutter(s). The aspect ratio of the tapered region is such that light which is internally reflected below the critical angle of the optical material is inhibited from entering the light gutter(s). This is a well known consequence of Snell's Law. According to a specific embodiment, the aspect ratio of the tapered region is such that only light reflected beyond the critical angle of the optical material, i.e., totally internally reflected light, enters the light gutter(s), while light reflected at less than the critical angle is rejected.

Using the combination of the light gutter(s) and the tapered region, the present invention ensures that most of the light reaching the detector(s) is the result of an object in contact with the overlay thereby solving the signal-to-noise ratio problems encountered with other optically-based techniques. In addition, the present invention has a significant advantage over currently available active touch screen technologies in that the overlay is passive, its simplicity representing dramatic improvements in reliability and cost. Another cost advantage results from the fact that alignment of the overlay is extremely simple and does not require the time consuming (and therefore costly) mechanical registration and calibration procedures necessary for other touch screen technologies. That is, because the position of the object with respect to the display screen (and not the overlay) is the parameter of interest, precise alignment of the overlay with the screen is not critical.

Thus, the present invention provides an input device comprising an overlay for a display screen comprising an optically conductive material. The overlay has a central region for transmitting first electromagnetic radiation corresponding to an object in contact with the overlay at a first location, and a light conduit along the edge of the central region for receiving and transmitting the first electromagnetic radiation. The light conduit is configured to inhibit transmission of the first electromagnetic radiation back into the central region of the overlay. At least one detector is coupled to the light conduit for receiving the first electromagnetic radiation and generating a signal indicative thereof. Location circuitry receives the signal and generates location data indicative of the first location. According to a specific embodiment, the thickness of the central region is controlled to inhibit second electromagnetic radiation corresponding to parasitic reflections from reaching the light conduit.

A further understanding of the nature and advantages of the present invention may be realized by reference to the remaining portions of the specification and the drawings.

DESCRIPTION OF SPECIFIC EMBODIMENTS

Figure 1B:
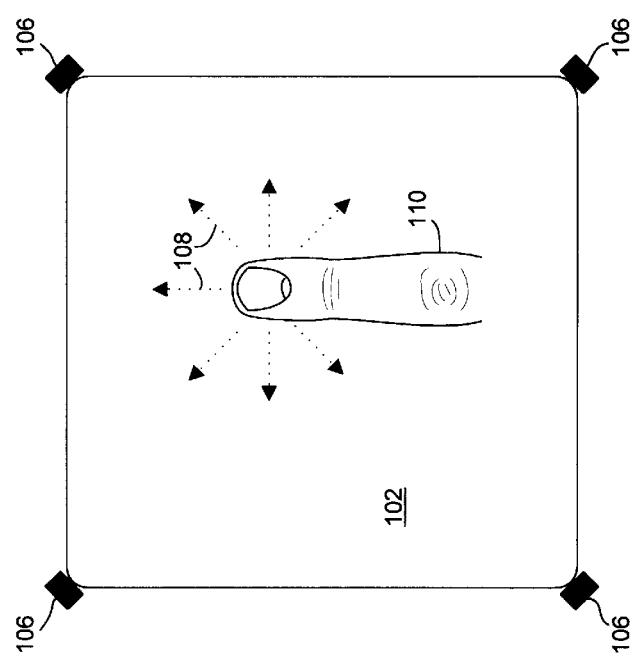
FIGS. 1a and 1b are side view and top view diagrams, respectively, of an optically-based touch screen designed according to the prior art.
Figure 1A:
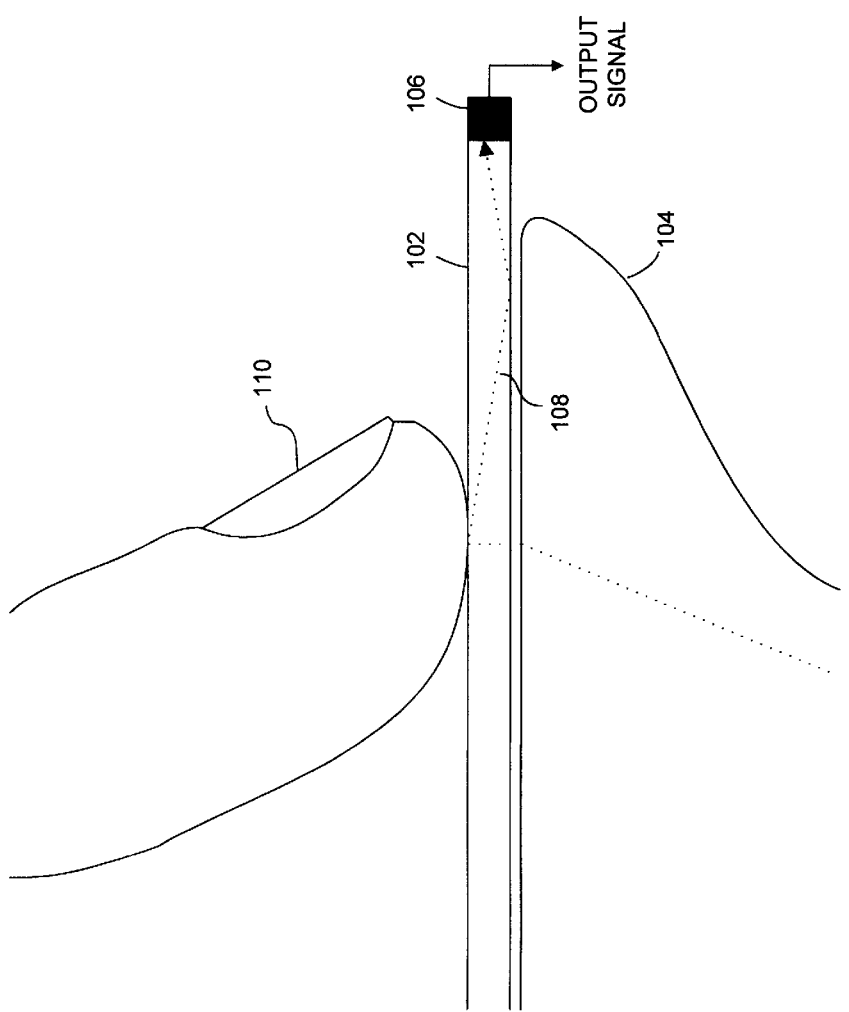
Figure 2A:
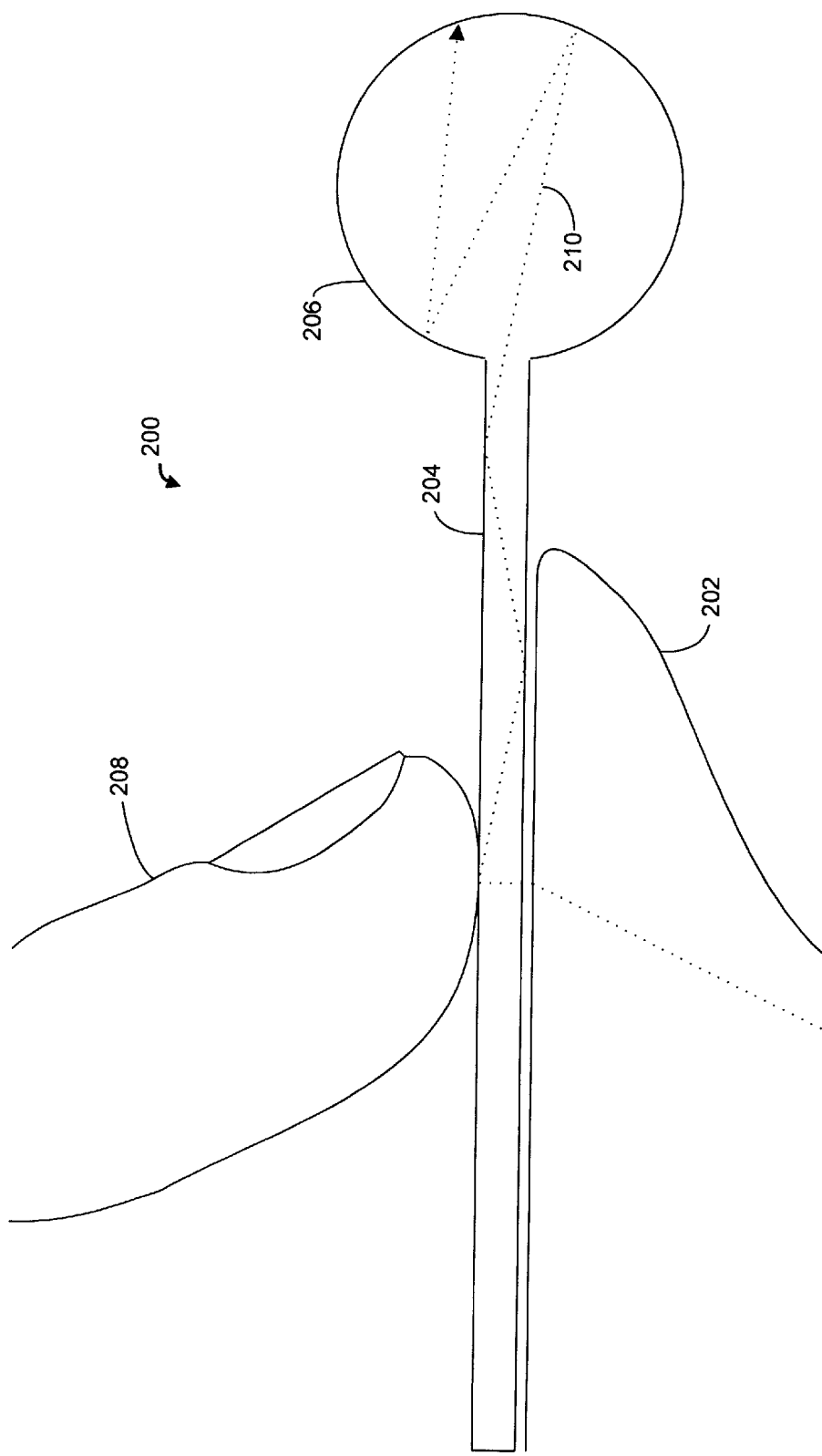
FIGS. 2a and 2b are side view diagrams of two different embodiments of an optically-based touch screen designed according to the invention.

FIG. 2a is a side view diagram of an optically-based touch screen overlay 200 designed according to a specific embodiment of the invention. It should be noted that the dimensions of the diagram are not to scale and that some of the dimensions have been exaggerated for purposes of this description. Overlay 200, which is placed adjacent a CRT 202, has a central region 204 and a light conduit or "light gutter" 206 which is contiguous with the edge of central region 204 and made from the same optically conductive material. According to a specific embodiment, overlay 200 is made of a clear plastic such as, for example, acrylic.

When light is emitted from CRT 202 and encounters fingertip 208 in contact with the surface of central region 204 it scatters. Some of the scattered light is diffused beyond the critical angle of the optical material and therefore remains trapped within central region 204 by total internal reflection. This trapped light 210 propagates to the edge of the overlay where it enters light gutter 206. As discussed above, because the diameter of light gutter 206 is significantly greater than the thickness of central region 204, most of light 210 will remain within light gutter 206 as demonstrated by the reflections shown.

Light gutter 206 then acts like an optical fiber in which the captured light propagates in either direction along its longitudinal axis. As will be discussed below, one or more detectors are positioned to receive the light from the light gutter and convert it to an electronic signal for use by position determination circuitry (not shown) to determine the position of the touch event. The implementation details of the position determination circuitry used with the various embodiments of the present invention are not important here. That is, the position determination circuitry may be based, for example, on similar circuitry discussed above with reference to light pen technology and may be implemented in any of a variety of ways.

Figure 2B:
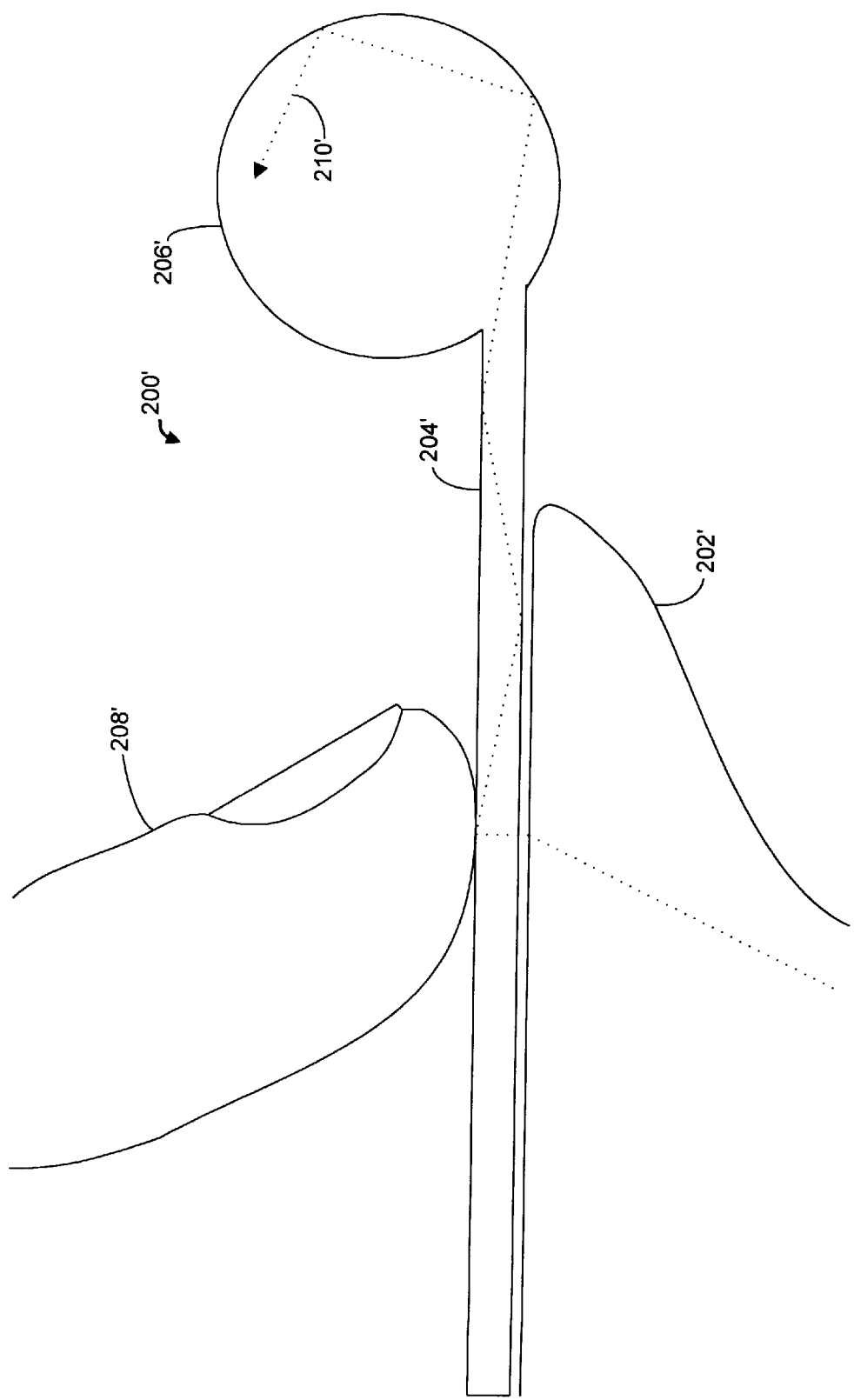

FIG. 2b is a side view diagram of an optically-based touch screen overlay 200' designed according to another specific embodiment of the invention. The elements of FIG. 2b have reference numbers similar to corresponding elements of FIG. 2a and operate in substantially the same manner. The difference with this embodiment is the orientation of light gutter 206' with respect to central region 204'. That is, in this embodiment central region 204' is not substantially aligned with the radius of the light gutter cross section as shown in FIG. 2a. Rather the point at which light gutter 206' joins with central region 204' is offset from the cross section radius. It will be understood that the light gutter and central region may be joined at a wide variety of angles and orientations without departing from the scope of the invention.

Figure 3:
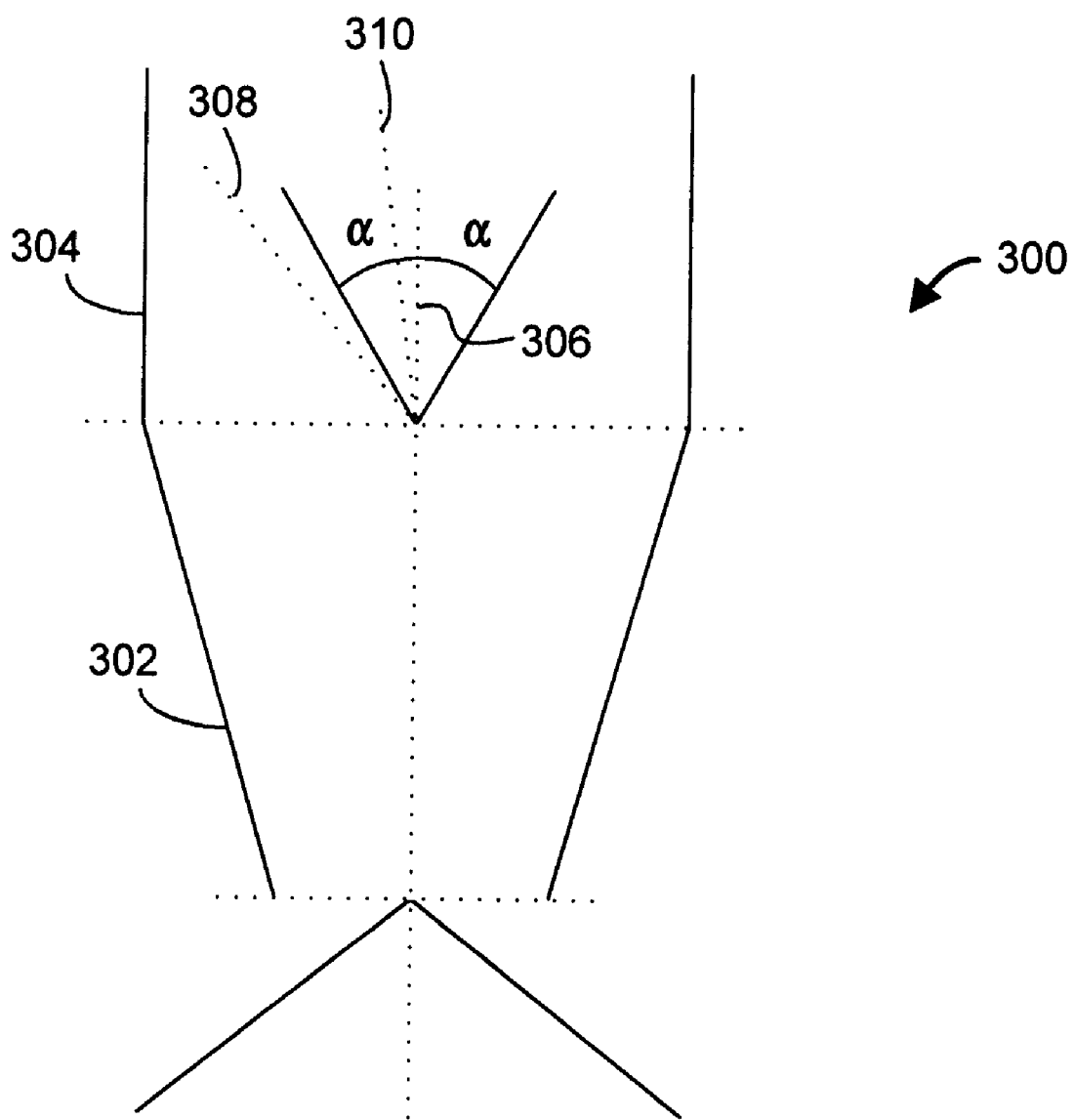
FIG. 3 is diagram of a light blocking taper.

Further improvements to the invention may be realized by using a well known consequence of Snell's law to educe, or even eliminate, the amount of light energy from parasitic reflections which enters the light gutter. FIG. 3 is a side view diagram of a light blocking taper 302 disposed adjacent a region 304 of substantially uniform thickness in optically conductive material 300. It is well known that, by manipulating the dimensions of taper 302, a light cone of acceptance (here represented by the angle $2\alpha$) may be constructed, outside of which angle light entering the wide end of the taper will not be transmitted through the narrow end of the taper. That is, light which enters taper 302 from region 304 at an angle with normal 306 greater than $\alpha$ (e.g., light beam 308) will not make it out the other side of taper 302. Light within the cone of acceptance (e.g., light beam 310) will be transmitted through. Additional information regarding Snell's law and its implications for tapers may be obtained from *Fiber Optics, Principles and Applications* by N. S. Kapany, Academic Press 1967, pp. 18–23, the entirety of which is incorporated herein by reference for all purposes.

Figure 4A:
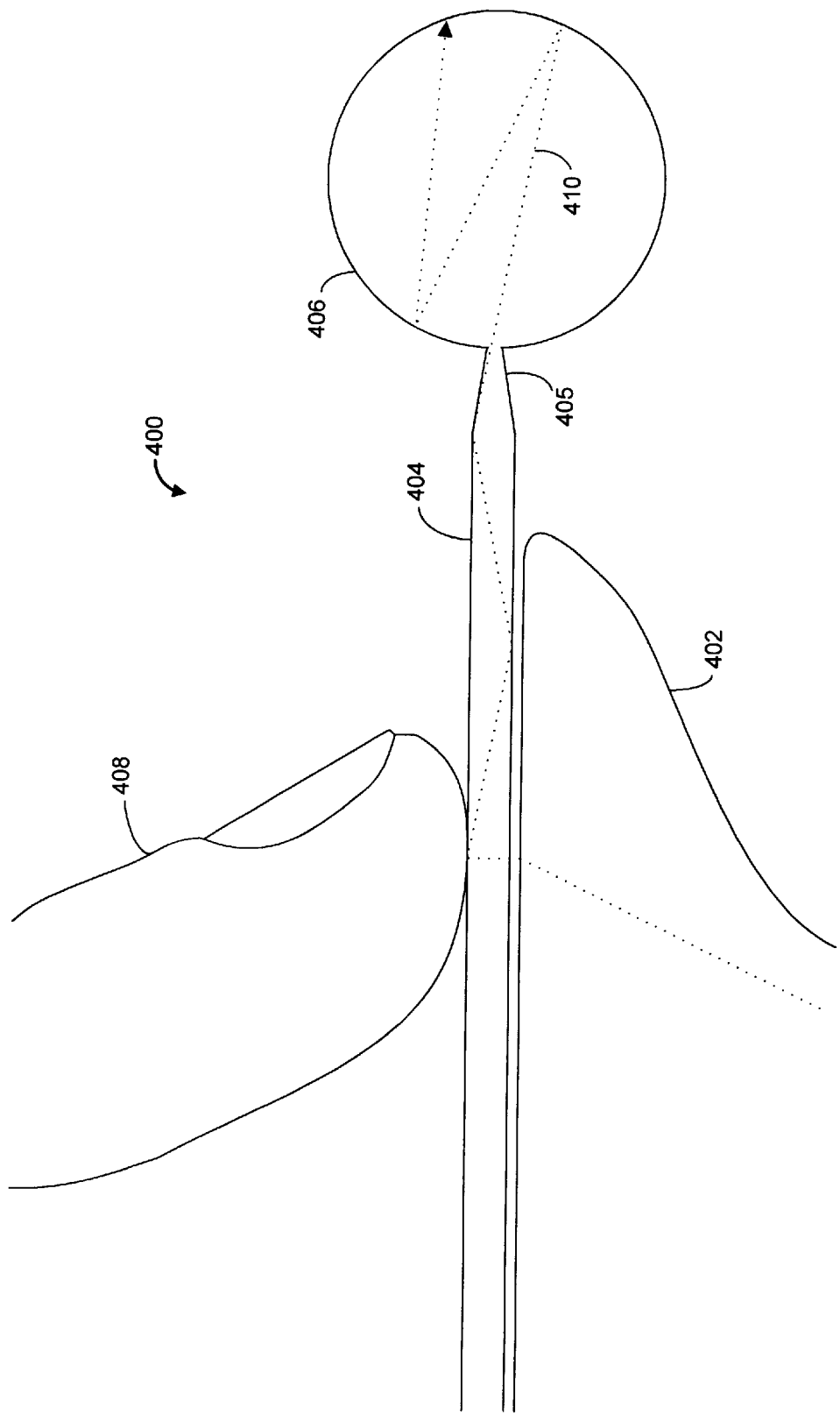
FIGS. 4a and 4b are side view diagrams of two different embodiments of an optically-based touch screen designed according to the invention.

FIG. 4a is a side view diagram of an optically-based touch screen overlay 400 designed according to another specific embodiment of the invention. Overlay 400 operates similarly to overlays 200 and 200' described above with reference to FIGS. 2a and 2b with the improvement discussed above with reference to FIG. 3. As with FIGS. 2a and 2b, it should be noted that the dimensions of the diagram of FIG. 4a (and FIG. 4b below) are not to scale and that some of the dimensions have been exaggerated for purposes of this description. As with the embodiment of FIG. 2a, overlay 400 is placed adjacent a CRT 402 and has a central region 404 and a light conduit or "light gutter" 406 which is contiguous with the edge of central region 404 and made from the same optically conductive material. However, unlike overlay 200, region 404 has a tapered region 405 adjacent light gutter 406.

Tapered region 405 is included for the purpose of inhibiting parasitic reflections from entering light gutter 406. According to a specific embodiment of the invention, the dimensions of tapered region 405 are controlled such that light which is not trapped within region 404 due to total internal reflection is not transmitted through the tapered region to light gutter 406. That is, only light from beyond the critical angle of the overlay material is passed to the light gutter.

When light is emitted from CRT 402 and encounters fingertip 408 in contact with the surface of central region 404 it scatters. Some of the scattered light is diffused beyond the critical angle of the optical material and therefore remains trapped within central region 404 by total internal reflection. This trapped light 410 propagates to the edge of the overlay where it passes through tapered region 405 and enters light gutter 406. Because the diameter of light gutter 406 is significantly greater than the thickness of tapered region 405 at their interface, most of light 410 will remain within light gutter 406 as demonstrated by the reflections shown. In fact, because of the decreased thickness of tapered region 405 with respect to the same interface in overlay 200, performance in this regard is enhanced. Light gutter 406 then acts like an optical fiber in which the captured light propagates in either direction along its longitudinal axis.

Figure 4B:
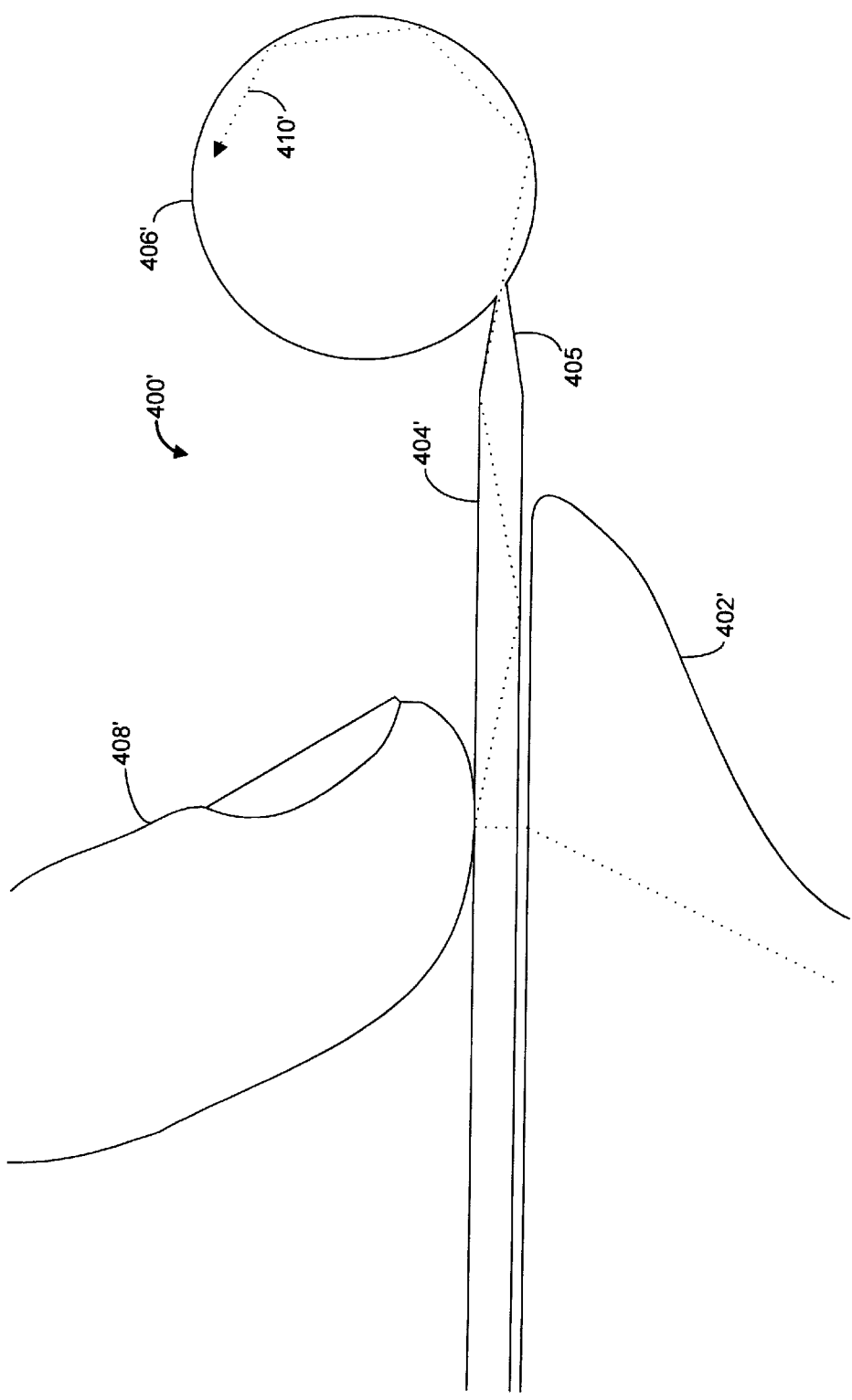

FIG. 4b is a side view diagram of an optically-based touch screen overlay 400' designed according to another specific embodiment of the invention. The elements of FIG. 4b have reference numbers similar to corresponding elements of FIG. 4a and operate in substantially the same manner. The difference with this embodiment is the orientation of light gutter 406' with respect to tapered region 405'. That is, in this embodiment tapered region 405' is not substantially aligned with the radius of the light gutter cross section as shown in FIG. 4a. Rather the point at which light gutter 406' joins with tapered region 405' is offset from the cross section radius. As mentioned above, it will be understood that the light gutter and central region may be joined at a wide variety of angles and orientations without departing from the scope of the invention.

Figure 5A:
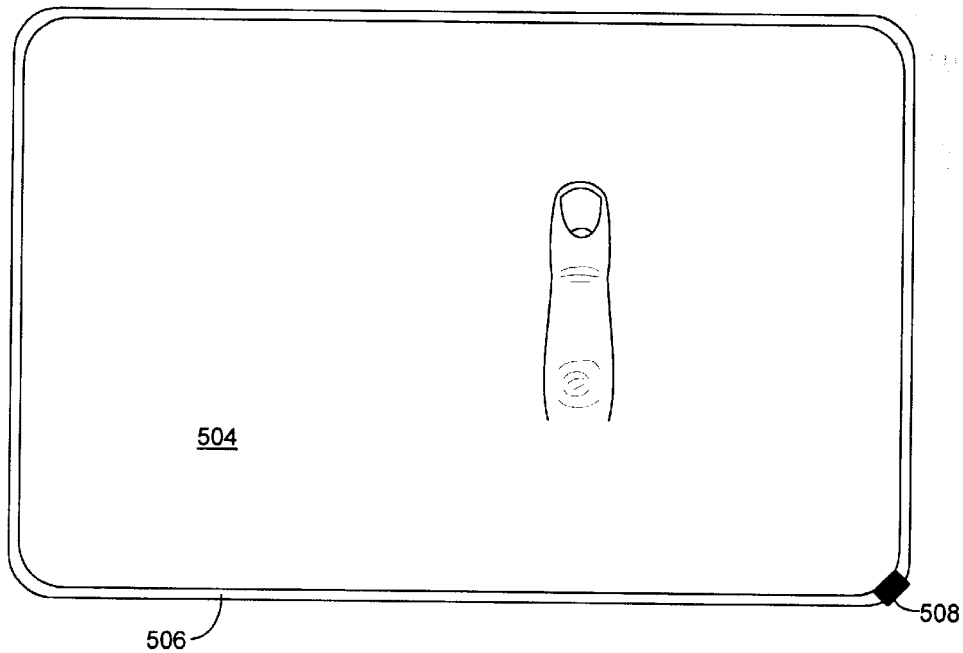
FIGS. 5a and 5b are top view diagrams of different embodiments of the invention.
Figure 5B:
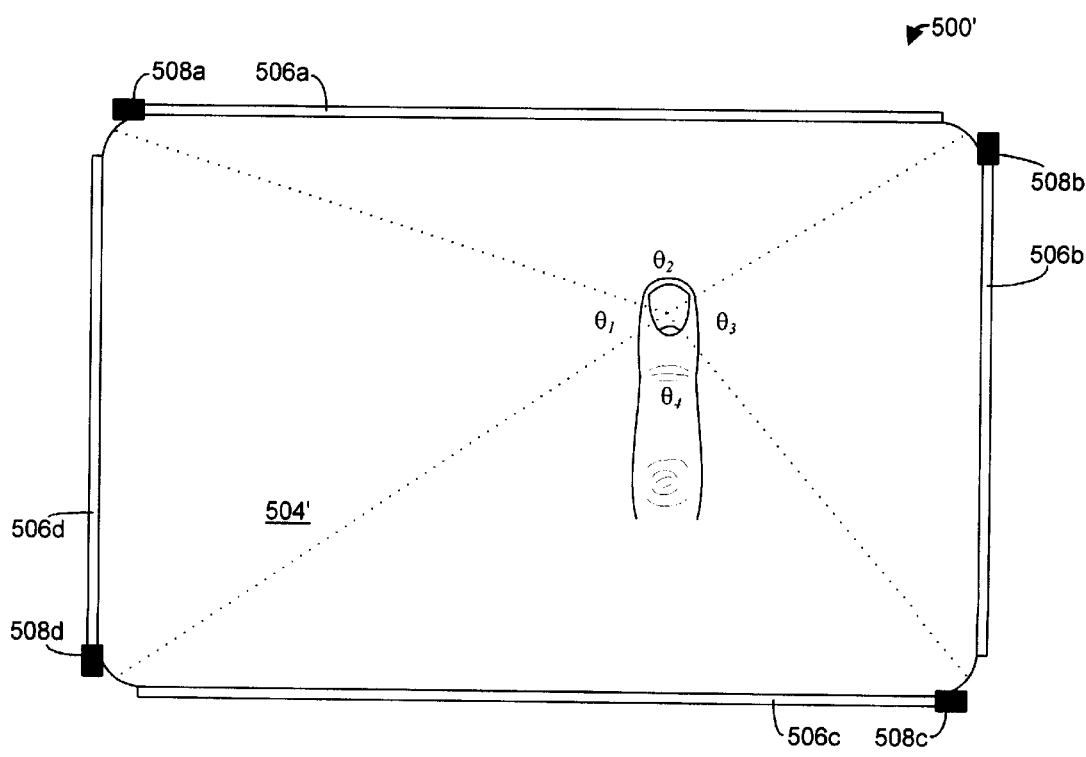

FIGS. 5a and 5b are top view diagrams of different embodiments of the invention. FIG. 5a shows an overlay 500 which has a single light gutter 506 which runs along nearly the entire perimeter of central region 504 and which is coupled to detector 508. As described above with reference to FIGS. 2 and 4, light trapped within region 504 by total internal reflection is collected in light gutter 506, transmitted along its longitudinal axes, around the rounded corners and ultimately is received by detector 508.

An alternate embodiment of an overlay 500' is shown in FIG. 5b in which there are four separate light gutters 506a–d disposed along the four edges of central region 504'. The four light gutters are coupled to four separate detectors 508a–d. As will be understood, the operation of overlays 500 and 500' are substantially similar.

Another source of noise which makes detection of a touch event problematic is light trapped in the overlay as a result of surface imperfections, e.g., lack of parallelism between the overlay surfaces, scratches and digs on the overlay surfaces, etc. According to specific embodiments of the invention, the edge of the overlay is tapered to prevent some of this light from reaching the light gutter(s). However, even with such a design, it is desirable to minimize the number of surface imperfections. Therefore in some embodiments, the overlay is made of a scratch proof material. Alternatively, a scratch protective coat is applied to the overlay. According to one specific embodiment, the overlay is plastic and a polysiloxane hard coat is applied using a dip process.

As discussed above, light collection at the gutter extremities is achieved by directly coupling photodetectors to the gutters or, alternatively, by using relay lenses to condense light coming out of the gutters onto photodetectors. In embodiments where more than one photodetector is used, additional improvements with regard to the signal-to-noise ratio may be achieved by the rejection of spurious signals. In addition, in multi-detector embodiments, the raster-scan sync timing method of localizing a touch event may be improved or even replaced.

As discussed above, the light blocking taper of the resent invention rejects unwanted parasitic light while the light gutter increases the efficiency of light collection from a touch event. However, the noise generated by light trapped due to scratches and digs in the overlay surface cannot be completely eliminated by the taper or the use of scratch resistant materials. Therefore, according to a specific embodiment in which four detectors are used (e.g., the embodiment of FIG. 5b), the signals received by the four detectors are processed for the purpose of discriminating between signals generated by the touch of a fingertip and signals due to scratches or parasitic reflections.

Because a fingertip is a quasi lambertian reflector, i.e., it diffuses light in all directions with equal intensity, it diffuses light toward all four light gutters and therefore corresponding signals are generated in all four detectors. The relative intensity of the signals received by each detector depends on the location of the touch point on the plate. If the touch point is in the center of the plate, the opposing light gutters, i.e., at the top and bottom or at the left and right, collect the same amount of light. If, on the other hand, the touch point is not at the center of the plate, opposing light gutters collect different amounts of light. The expected difference for a given touch location is estimated by calculating the angles determined by the touch point and the four corners of the plate as shown in FIG. 5b. It will be understood that a unique set of angles O exists for each location on the overlay. In any case, the difference is bound by the geometry of the plate. That is, there is a maximum difference between signals from the four detectors in the event of a lambertian touch point in a corner of the plate.

By contrast, in the case of a scratch or a parasitic reflection on the plate the trapped light is not diffused in all directions with equal intensity, but rather reflected in a specular fashion. This causes the difference between the intensity of the unwanted signals received in each of the four detectors to exceed the maximum difference associated with a lambertian diffuser (such as a fingertip). Therefore, according to a specific embodiment, a threshold is established for signal differences above which signals are attributed to scratches and parasitic reflections on the plate, and therefore ignored. According to another embodiment, the signal differences between the detectors of opposing gutters are used to establish the coordinates of the touch event on the overlay. That is, the ratio of received light (or the difference) for each pair of opposing light gutters is used to determine x- and y-coordinates of the touch as dictated by the unique set of angles associated with the touch location. According to some embodiments, these data are used to complement and refine the position data obtained using the raster scan timing technique discussed above. That is, where both techniques indicate a touch event at a particular location, an inherently more reliable determination is achieved. According to other embodiments, this technique is used to determine the location of a touch event instead of the raster scan technique where, for example, the display is not addressed in a raster scan mode, e.g., a liquid crystal display (LCD) or an electro-luminescent display.

According to the present invention, a number of starting materials and techniques may be employed to manufacture touch screen overlays with beveled edges and light gutters. For example, if glass is chosen as the starting material, sheets can be grounded and polished at the edges using well known techniques to obtain the desired cross-section dimensions. Such techniques may require each glass sheet to be machined one at a time using diamond-cutting equipment with computer controls.

If, on the other hand, plastic is chosen as the starting material, different options are available for the manufacture of the touch screen overlays with beveled edges and light gutters. For example, one option is to make a mold and manufacture parts using conventional injection molding or compression molding techniques. Injection molding consists of injecting a hot, molten polymer into a cold mold. After the art cools and solidifies, the mold is opened and the part is ejected. Another option, compression molding, is slightly different. With compression molding, a charge is placed in the mold, which is subsequently closed and held at a high pressure. The mold is heated to initiate the thermosetting cure reaction. With both techniques, overlays may be formed having the desirable cross-section at the edges, i.e., beveled edges and light gutters.

Another technique involves using acrylic or polycarbonate sheets and locally "forming" them at the edges to obtain the desirable cross-sections. Acrylic sheets can be made optically clear, transparent and lightweight, and have high impact resistance, good chemical resistance, and excellent thermoformability and machinability. Such sheets are available in a number of optical grades and thicknesses (ranging, for example, from 0.1" to 1"). One of the most useful properties of acrylic plastic is its formability. Being thermoplastic, it becomes soft and pliable when heated and can then be formed to almost any desired shape. As the material cools, it stiffens and retains the shape to which it has been formed. Hot acrylic can be handled much like pure gum rubber and approximately the same force is required to stretch it. Depending on the size, shape and optical requirements of the formed part, different forming methods can be used.

Figure 6A:
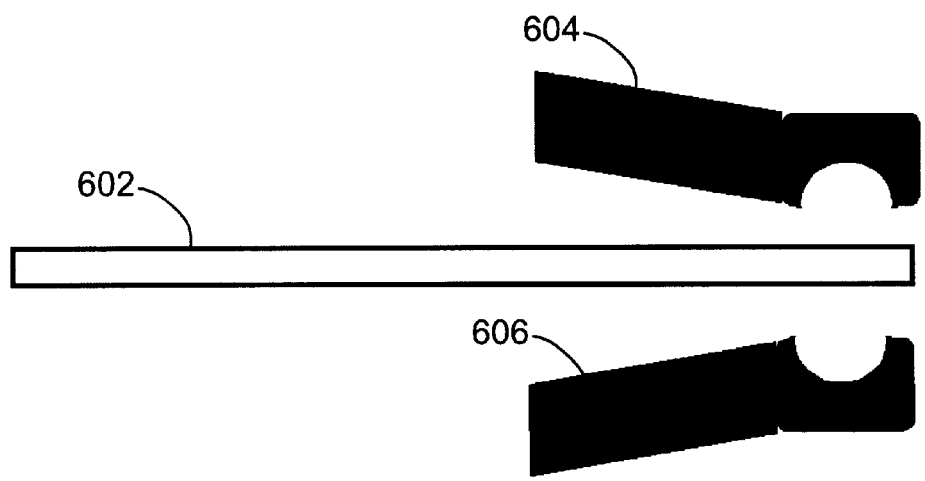
FIGS. 6a and 6b illustrate a method of manufacturing an optically-based touch screen according to a specific embodiment of the invention.
Figure 6B:
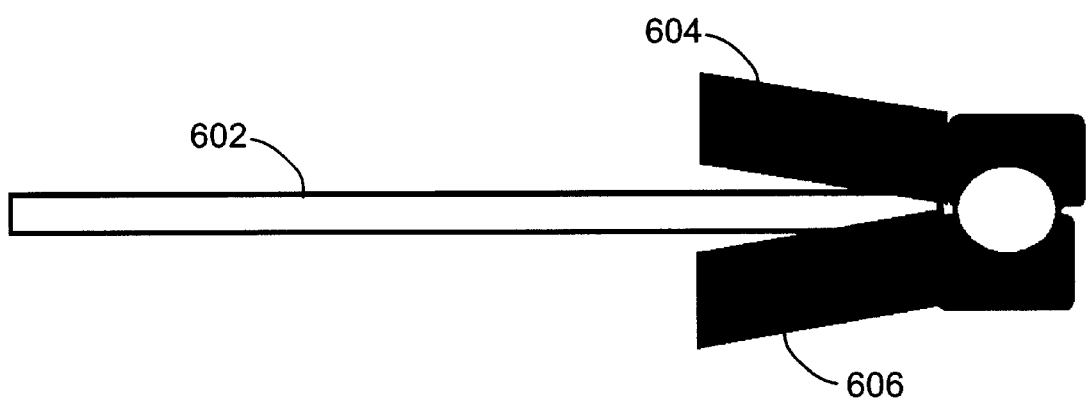

FIGS. 6a and 6b illustrate part of a method of manufacturing an optically-based touch screen according to a specific embodiment of the invention. To produce the beveled edges and light gutters a heating device selectively heats the edges of an acrylic sheet 602 and mechanically or hydraulically actuated metal forms 604 and 606 press at the periphery of the softened sheet to create the beveled edge and light gutter. Localized heat may be produced using infrared radiant heating or simply heating up the metal forms themselves. The appropriate temperatures and times for forming and cooling must be selected to achieve the desired goal and are within the skill of a person or ordinary skill in the relevant art.

While the invention has been particularly shown and described with reference to specific embodiments thereof, it ill be understood by those skilled in the art that changes in the form and details of the disclosed embodiments may be made without departing from the spirit or scope of the invention. For example, some embodiments have been described with reference to a tapered region which rejects substantially all light not due to total internal reflection. It will be understood, however, that tapers having a wide variety of dimensions may be employed without departing from the invention. For example, depending upon the signal-to-noise ratio desired, a tapered region which allows some parasitic reflections into the light gutter may be employed. Also, even though the light gutter of the present invention has been described with circular cross-sections, other cross-sections may be employed.

In addition, while FIGS. 5a and 5b show only two possible configurations of light gutters, other configurations remain within the scope of the invention. For example, a single light gutter along only one edge of the overlay may be employed. Alternatively, one or two light gutters, each of which is disposed along two edges of the overlay may be employed. Therefore, the scope of the invention should be determined with reference to the appended claims.

What is claimed is:

1. An input device comprising:
   an overlay for a display screen comprising an optically conductive material, the overlay having a central region for transmitting first electromagnetic radiation corresponding to an object in contact with the overlay at a first location, and a light conduit along the edge of and integrally formed with the central region for receiving and transmitting the first electromagnetic radiation, the light conduit being configured to inhibit transmission of the first electromagnetic radiation back into the central region of the overlay;
   at least one detector coupled to the light conduit for receiving the first electromagnetic radiation and generating a signal indicative thereof; and
   location circuitry for receiving the signal and generating location data indicative of the first location.

2. The input device of claim 1 wherein the thickness of the central region is controlled to inhibit second electromagnetic radiation corresponding to parasitic reflections from reaching the light conduit.

3. The input device of claim 2 wherein the thickness of the central region is controlled such that the central region comprises a tapered region near the edge of the central region and adjacent the light conduit.

4. The input device of claim 3 wherein the tapered region tapers from a first thickness to a second thickness adjacent the light conduit, the second thickness being less than the first thickness.

5. The input device of claim 4 wherein the first thickness and the second thickness are such that only electromagnetic radiation which is totally internally reflected within the central region is transmitted into the light conduit.

6. The input device of claim 1 wherein the first electromagnetic radiation is diffused by the object and trapped within the central region of the overlay by total internal reflection.

7. The input device of claim 1 wherein the first electromagnetic radiation comprises light from the display screen.

8. The input device of claim 1 wherein a cross-section of the light conduit is larger than the thickness of the central region adjacent the light conduit.

9. The input device of claim 8 wherein the cross-section of the light conduit is substantially circular.

10. The input device of claim 9 wherein the light conduit comprises a single conduit adjacent more than one edge of the central region of the overlay.

11. The input device of claim 9 wherein there are a plurality of light conduits adjacent a plurality of edges of the central region of the overlay.

12. The input device of claim 1 wherein the display screen has raster circuitry associated therewith, the raster circuitry generating raster timing data, and wherein the location circuitry is operable to receive the raster timing data and correlate the raster timing data with the first electromagnetic radiation, thereby generating the location data.

13. The input device of claim 1 wherein the at least one detector comprises a plurality of detectors provided at the edge of the overlay, and wherein the location circuitry is operable to compare light received by selected ones of the plurality of sensors and generate the location data therefrom.

14. The input device of claim 1 wherein the overlay comprises a scratch resistant material.

15. The input device of claim 1 wherein the overlay comprises a scratch resistant coating.

16. The input device of claim 15 wherein the scratch resistant coating comprises polysiloxane.

17. An input device for a system having a display screen comprising:
   an overlay for the display screen comprising an optically conductive material, the overlay having a central region for transmitting first electromagnetic radiation corresponding to an object in contact with the overlay at a first location, and a light conduit along the edge of and integrally formed with the central region for receiving and transmitting the first electromagnetic radiation, the thickness of the central region being controlled to inhibit second electromagnetic radiation corresponding to parasitic reflections from reaching the light conduit, the light conduit having a cross-section which is larger than the thickness of the central region adjacent the light conduit;

at least one detector coupled to the light conduit for receiving the first electromagnetic radiation and generating a signal indicative thereof; and circuitry for receiving the signal and generating data indicative of the first location.

18. An overlay for a display screen composing an optically conductive material, the overlay having a central region for transmitting first electromagnetic radiation corresponding to an object in contact with the overlay at a first location, and a light conduit along the edge of and integrally formed with the central region for receiving and transmitting the first electromagnetic radiation, the light conduit being configured to inhibit transmission of the first electromagnetic radiation back into the central region of the overlay.

19. The overlay of claim 18 wherein the thickness of the central region is controlled to inhibit second electromagnetic radiation corresponding to parasitic reflections from reaching the light conduit.

20. The overlay of claim 19 wherein the tapered region tapers from a first thickness to a second thickness adjacent the light conduit, the second thickness being less than the first thickness.

21. The overlay of claim 20 wherein the first thickness and the second thickness are such that only electromagnetic radiation which is totally internally reflected within the central region is transmitted into the light conduit.

22. The overlay of claim 18 wherein a cross-section of the light conduit is larger than the thickness of the central region adjacent the light conduit.

23. The overlay of claim 22 wherein the cross-section of the light conduit is substantially circular.

\* \* \* \* \*